Dec. 23, 1952 H. W. MEYERS 2,622,639
MACHINE FOR CUTTING AND GROOVING BOTTOMS OF TENPINS
Filed Sept. 1, 1950 2 SHEETS—SHEET 1
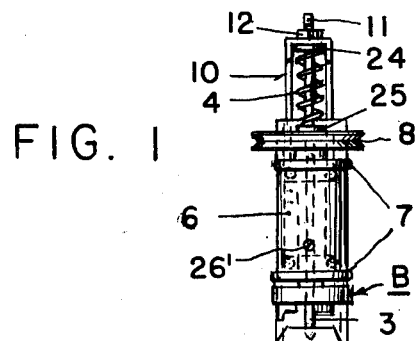
FIG. 1
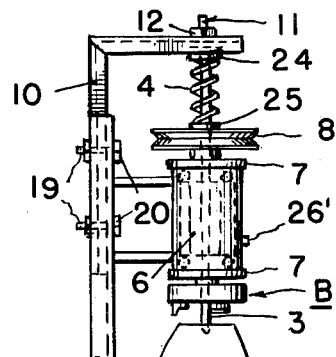
FIG. 2
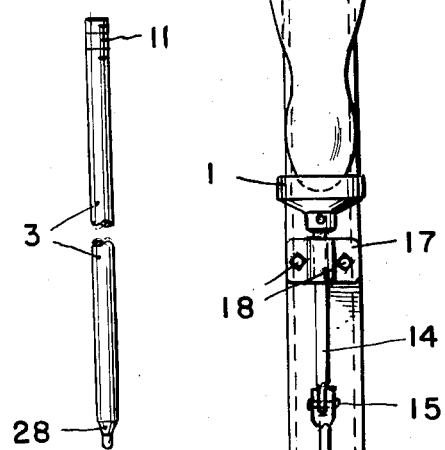
FIG. 8
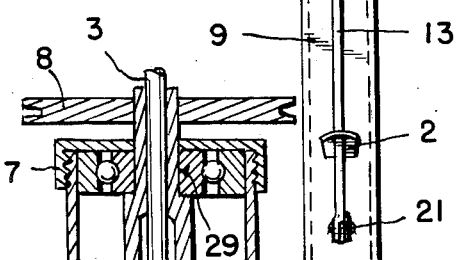
FIG. 7
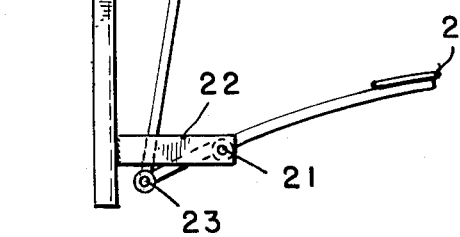
INVENTOR
HENRY WAYNE MEYERS
BY James M. Drysdale
ATTORNEY Dec. 23, 1952 H. W. MEYERS 2,622,639
MACHINE FOR CUTTING AND GROOVING BOTTOMS OF TENPINS
Filed Sept. 1, 1950 2 SHEETS—SHEET 2

*INVENTOR*
HENRY WAYNE MEYERS

BY *James M. Drysdale*

*ATTORNEY*

Patented Dec. 23, 1952

2,622,639

UNITED STATES PATENT OFFICE 2,622,639

MACHINE FOR CUTTING AND GROOVING BOTTOMS OF TENPINS

Henry W. Meyers, East Detroit, Mich.

Application September 1, 1950, Serial No. 182,838

7 Claims. (Cl. 144—136)

1

In the game of bowling the pins become damaged in a short time either by being struck by the balls or by each other and must either be replaced by new pins or if possible the damaged pins must be reconditioned either by resquaring the bottoms thereof to secure proper alinement of the pins when set up or they must be resurfaced or both.

This invention relates to tools for forming bodies of revolution by reason of rotation of the tool relatively to the body and has more particular reference to a revolving cutter adapted for dressing or trimming the base of bowling pins and the like, although certain salient features of the invention are applicable to turning or facing tools generally.

The lower peripheral edges of bowling pins become battered and worn after repeated use to a degree which renders them unfit for further use. Badly worn pins are unstable and cannot be made to stand up properly.

It has been customary to trim the bases of such pins to normal by the ordinary process of facing them in a wood lathe.

Such a process, as is well known, requires a preliminary setting up and chucking of the pin, besides well known adjustments of the tool and manipulations of the lathe, all of which consumes considerable time, besides taking a deeper cut than is necessary to restore the base to its original shape.

The principal object of this invention is therefore to provide an improved machine for trimming bowling pins which does not require the attention of or operation by a skilled mechanic and which is simple and compact in construction and effective and efficient in operation.

Another object is to provide a tool which needs no manipulation while cutting.

Another object is to provide a tool which can be operated to remove no more material than is necessary in reforming the base.

A further object is to provide means for automatically grooving the base of the pins relatively to the axial cylindrical bore.

Another object is to provide means for removably securing the cutters and grooving means to the revoluble head of the tool.

Another object is to provide means for automatically centering the pins relatively to the tool.

Other objects and advantages of the invention will be apparent during the course of the following description.

In the accompanying drawings, forming part of this specification and in which like numerals are employed to designate like parts throughout the same.

Fig. 1 is a front elevation of the machine.

Fig. 2 is a side elevation of the machine attached to a wall bracket.

Fig. 7 is a side elevation of the spindle threaded at one end and having a bronze bushing press fitted at each end.

Fig. 8 is a side elevation of the pilot rod threaded at its upper end.

Figure 3:
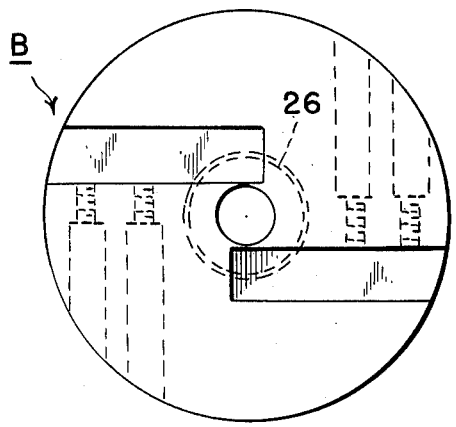
Fig. 3 is a bottom view of one of the cutter heads with the cutters removed.
Figure 4:
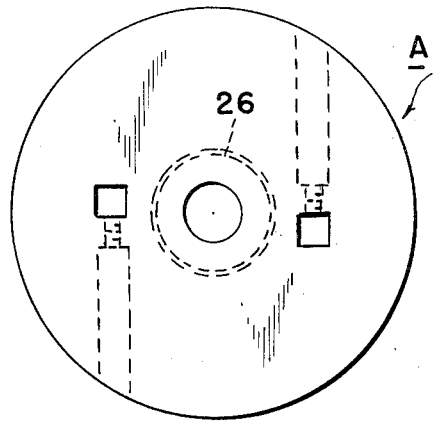
Fig. 4 is a bottom view of another of the cutter heads with the cutters removed.

In the drawings, wherein for the purpose of illustration, is shown a preferred embodiment of my invention, the numeral 1 designates the feeding head for supporting the ten pin.

This feeding head 1 is mounted on a slidable rod 14 passing through a collar 17 mounted on a horizontal arm 16 which is rigidly attached at right angles to the upright support or bracket 9 by means of bolts 18. The support 9 is adapted to be rigidly attached to a wall and is provided with an angular extension 10. This extension 10 is adjustably attached to the support 9 by means of suitable nuts 19 and bolts 20. Passing through the extension 10 near its end is a guide pin 3 having a tapered end 28 and provided at its upper end with a nut 12 threaded on the threaded end 11 of the guide pin 3. The guide pin 3 is mounted within the hollow spindle, extends above and below the same and is slidable through the hollow spindle and angular extension.

The feeding head 1 may be moved up or down by means of a foot pedal 2 pivoted at 21 to a bracket arm 22 mounted near the lower end of the support 9. To the lower end of the pedal 2 is pivoted at 23 a link 13 which is pivoted at 15 to the slidable rod 14 on which is mounted the feeding head 1 which is moved upwardly thereby when the operator presses down the foot pedal 2. The spindle housing 6 is rigidly attached to the support 9 near its upper end.

Within the spindle housing 6 is mounted a hollow spindle 30 having a lower threaded end such as shown in Fig. 7 mounted in brass bearing caps or bushings 7 fitted over the bearing surfaces 29 at each end. To the upper end of the spindle 30 is attached a V pulley 8 which is rotated by means of a belt and electric motor (not shown) thereby imparting rotary movement to the spindle.

Above the spindle and surrounding the guide pin 3 is a spring thrust 4 mounted between a washer 24 near its upper end and a stop washer 25 which is drilled and tapped so as to be securely fastened to the guide pin 3 above the V pulley 8. The washer 24 is slidable on the guide pin 3 and abuts against the extension 10. The sliding movement of the washer 24 on the pin 3 is limited by the extension 10 above the washer.

To the lower threaded end of the hollow spindle may be attached either the cutting head B or the cutting head A having threaded openings 26 which engage the threaded end 27 of the hollow spindle 30.

Figure 5:
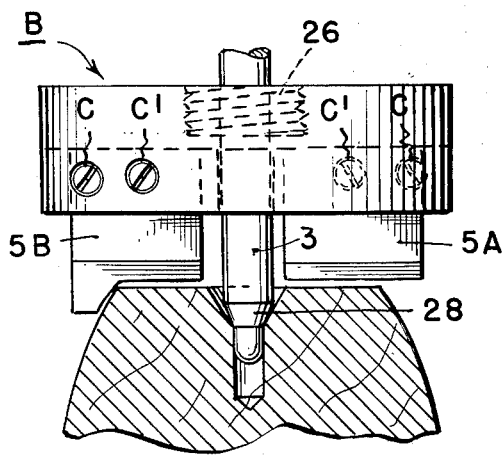
Fig. 5 is a front elevation partly in section of one of the cutter heads.
Figure 6:
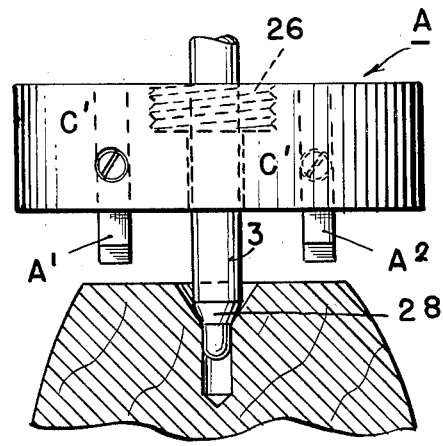
Fig. 6 is a front elevation partly in section of another of the cutter heads.

The cutting head B has mounted therein two cutting tools 5B as shown in Fig. 5 and 5A. The cutting tool 5A, as clearly shown, has a straight horizontal cutting edge extending across the whole radius of the bowling pin to trim the base of said pin. The cutting tool 5B clearly shows a straight horizontal inner portion and a curved outer portion adapted to round the edges of the pin.

The bowling pin contacts cutting tool 5A across the whole radius of the pin at one time with the outer diameter being cut first or ahead of the center so as to cut clean and against the solid center of the pin. Tool 5B is for rounding the edges. Both tools 5A and 5B are locked to the cutter head B by means of locking screws C, C$^1$.

Cutter head A is for the purpose of cutting a circular groove in the bottom of the pin. A suitable fibre ring is pressed into this circular groove by another machine which is not shown and is not a part of this invention. The cutter head A is provided with two cutting tools A$^1$ and A$^2$ of slightly different sizes for cutting a circular groove in which is fitted a fibre ring. As clearly shown, said tools each have a square shank and a beveled chisel like cutting edge adapted to cut a circular groove in the bottom of the pin. Both cutting tools are adjustable for depth and are locked to the cutter head by means of locking screws. The machine is oiled by providing a drill tap 26' for an "Alemite" fitting on the side of the spindle housing 6.

In operation, the cutting head B is first attached to the threaded end 28 of the spindle 30. The bowling pin is then placed in the feeding head, moved upwardly by pressing the foot pedal 2 until it engages the tapered end 28 of the guide pin 3 and is firmly held in fixed position due to the pressure of the spring thrust 4.

The motor is then started to operate the cutting head B and the bowling pin is suitably trimmed by means of the knives 5A and 5B mounted in the cutter head B.

After this cutting operation, the cutter head B is removed and the cutter head A attached in its place. A circular groove of the desired size and depth is then cut in the bottom face of the pin by means of the cutters A$^1$ and A$^2$ mounted in the cutter head A.

Obviously, modifications of this invention may be resorted to without departing from the spirit thereof or the scope of the appended claims.

I claim:

1. In a machine of the character described, an upright support, a feeding head movably mounted thereon, lever and link mechanism attached below the feeding head to raise or lower the same, a spindle housing attached to the upright support above the feeding head, a hollow spindle in alinement with the feeding head rotatably mounted in the spindle housing, a guide pin within the hollow spindle and extending above and below the same and slidable through the hollow spindle, a V pulley attached to the upper end of the hollow spindle for rotating the same, a stop washer attached to the guide pin above the V pulley, an angular extension on said upright support, a spring thrust mounted on the guide pin above the stop washer and abutting against said angular extension and a cutter head attached to the lower end of the hollow spindle.

2. In a machine for redressing ten pins, an upright support, a feeding head movably mounted thereon for holding a pin, a spindle housing attached to the upright support above the feeding head, a hollow spindle in alinement with the feeding head rotatably mounted in the spindle housing, a guide pin within the hollow spindle and extending above and below the hollow spindle, means attached to the feeding head for raising the same to clamp the ten pin between the feeding head and the guide pin, a cutter head attached to the lower end of the hollow spindle, and a pulley attached to the upper end of the hollow spindle for rotating the hollow spindle and cutter head mounted thereon for trimming the end of the bowling pin an angular extension on said upright support, a spring thrust surrounding the guide pin above the pulley and abutting against said angular extension.

3. In a bowling pin reconditioning machine, an upright support, a feeding head movably mounted thereon for holding a pin, a spindle housing attached to the upright support above the feeding head, a hollow spindle in alinement with the feeding head rotatably mounted in the spindle housing, a pulley attached to the upper end of the hollow spindle, a cutter head attached to the lower end of the hollow spindle, a guide pin within the hollow spindle and extending above and below the hollow spindle, means to raise the feeding head to clamp a bowling pin between the same and the guide pin, an angular extension on said upright support, a spring thrust surrounding the guide pin above the pulley and abutting against said angular extension.

4. In a machine of the character described, a wall bracket or upright support, a feeding head movably mounted thereon for holding a bowling pin, a spindle housing attached to the upright support above the feeding head, a hollow spindle rotatably mounted in the spindle housing and having a lower threaded end, a guide pin movable within the hollow spindle and extending above and below the same, an angular extension on said upright support, a spring thrust surrounding the guide pin above the spindle housing and abutting against said angular extension, a stop washer attached to the guide pin below the spring thrust, another washer supported by the spring thrust and slidable on the guide pin, a cutter head attached to the lower end of the hollow spindle, a pulley attached to the upper end of the hollow spindle for rotating the hollow spindle and cutter head mounted thereon for trimming the base of the bowling pin.

5. In a machine of the character described, a wall bracket or upright support, a feeding head movably mounted thereon for holding a bowling pin, a spindle housing attached to the upright support above the feeding head, a hollow spindle rotatably mounted in the spindle housing and having a lower threaded end, a guide pin movable within the hollow spindle and extending above and below the same, an angular extension on said upright support, a spring thrust surrounding the guide pin above the spindle housing and abutting against said angular extension, a stop washer attached to the guide pin below the spring thrust, another washer supported by the spring thrust and slidable on the guide pin, a cutter head having a threaded opening for engaging the lower threaded end of the hollow spindle, two cutting tools mounted on said cutter head, one tool having a straight horizontal cutting edge extending across the whole radius of the bowling pin to trim the base of said pin, the other cutting tool having a straight horizontal inner portion and a curved outer portion adapted to round the edges of the pin, both cutting tools being locked to the cutter head by means of locking screws.

6. In a machine for redressing ten pins, a wall bracket or upright support, a feeding head movably mounted thereon for holding a bowling pin, a spindle housing attached to the upright support above the feeding head, a hollow spindle rotatably mounted in the spindle housing and having a lower threaded end, a guide pin movable within the hollow spindle and extending above and below the same, an angular extension on said upright support, a spring thrust surrounding the guide pin above the spindle housing and abutting against said angular extension, a stop washer attached to the guide pin below the spring thrust, another washer supported by the spring thrust and slidable on the guide pin, a cutter head having a threaded opening for engaging the lower threaded end of the hollow spindle, two cutting tools of different sizes mounted on said cutter head, said tools each having a square shank and a beveled chisel like cutting edge adapted to cut a circular groove in the bottom of the pin and means for locking said cutting tools to the cutter head.

7. In a machine for trimming or dressing the base of bowling pins, a wall bracket or upright support, a feeding head movably mounted thereon for holding a bowling pin, a spindle housing attached to the upright support above the feeding head, a hollow spindle rotatably mounted in the spindle housing, an angular extension on said upright support, a cutter head attached to the lower end of the hollow spindle, a guide pin within the hollow spindle, extending above and below the same, and slidable through the hollow spindle and angular extension, means attached to the feeding head for raising the same to clamp the bowling pin between the feeding head and the guide pin, a pulley attached to the upper end of the hollow spindle for rotating the hollow spindle and cutter head mounted thereon for trimming the base of the bowling pin, a spring thrust surrounding the guide pin above the pulley and abutting against said angular extension at its upper end and against said pulley at its lower end.

HENRY W. MEYERS.

REFERENCES CITED

The following references are of record in the file of this patent:

UNITED STATES PATENTS

| Number | Name | Date |
|---|---|---|
| 615,251 | Cooper | Dec. 6, 1898 |
| 1,439,900 | Kernes et al. | Dec. 26, 1922 |
| 1,617,621 | Evans | Feb. 15, 1927 |
| 1,644,530 | Johnson | Oct. 4, 1927 |
| 1,661,789 | Coibion | Mar. 6, 1928 |